US006906925B2

(12) United States Patent
Robbins et al.

(10) Patent No.: US 6,906,925 B2
(45) Date of Patent: Jun. 14, 2005

(54) APPARATUS AND METHOD FOR MAXIMIZING EQUIPMENT STORAGE DENSITY

(75) Inventors: Shane R. Robbins, Santaquin, UT (US); David Turner, Taylorsville, UT (US)

(73) Assignee: Linux Networx, Inc., Bluffdale, UT (US)

( * ) Notice: Subject to any disclaimer, the term of this patent is extended or adjusted under 35 U.S.C. 154(b) by 0 days.

(21) Appl. No.: 10/875,355

(22) Filed: Jun. 24, 2004

(65) Prior Publication Data

US 2004/0228098 A1 Nov. 18, 2004

Related U.S. Application Data

(63) Continuation of application No. 10/191,923, filed on Jul. 9, 2002.

(51) Int. Cl.[7] .................................................. G06F 1/16

(52) U.S. Cl. ....................... 361/725; 361/724; 361/727; 361/610; 312/322; 312/323

(58) Field of Search ................................ 361/610, 622, 361/601, 625, 641, 724–727, 822–827, 828–829; 439/61, 65, 325–346, 534, 954; 379/315–340; 16/115, 124, 225, 229; 292/145, 163, 164, 175; 174/52.1, 59, 253; 399/88, 90, 107, 110; 307/33, 38–39, 52, 129, 150; 312/223.1, 223.2, 223.3, 322, 323, 265.1

(56) References Cited

U.S. PATENT DOCUMENTS

| | | | | |
|---|---|---|---|---|
| 2,185,562 A | | 1/1940 | Nielson | |
| 2,572,617 A | | 10/1951 | Haury et al. | |
| 2,572,618 A | | 10/1951 | Haury et al. | |
| 4,258,967 A | * | 3/1981 | Boudreau | 312/322 |
| 4,675,900 A | | 6/1987 | Temkin | |
| 4,731,703 A | | 3/1988 | Tsukaguchi et al. | |
| 5,169,221 A | * | 12/1992 | Wheeler | 312/323 |
| 5,663,868 A | | 9/1997 | Stalley | 361/695 |
| 5,781,410 A | | 7/1998 | Keown et al. | |
| 5,918,089 A | | 6/1999 | Malinich et al. | |
| 6,201,690 B1 | | 3/2001 | Moore et al. | 361/683 |
| 6,229,691 B1 | | 5/2001 | Tanzer et al. | |
| 6,269,959 B1 | | 8/2001 | Haworth | 211/26 |
| 6,330,161 B1 | | 12/2001 | Smith et al. | |
| 6,445,585 B1 | | 9/2002 | Walker | |
| 6,498,716 B1 | | 12/2002 | Salinas et al. | |
| 6,561,602 B1 | | 5/2003 | Sevier et al. | |

* cited by examiner

*Primary Examiner*—Michael Datskovskiy
(74) *Attorney, Agent, or Firm*—Madson & Metcalf

(57) ABSTRACT

A mounting mechanism for mounting a enclosure-mountable device to an equipment enclosure having a plurality of vertical mounting rails disposed so as to define an equipment storage region is disclosed. The mounting mechanism includes a first portion configured to be attached to the enclosure-mountable device, and a second portion configured to be attached to one or more of the vertical mounting rails. The first and second portions are configured such that the enclosure-mountable device may be disposed in a first position outside the equipment storage region and a second position outside the equipment storage region.

24 Claims, 16 Drawing Sheets

APPARATUS AND METHOD FOR MAXIMIZING EQUIPMENT STORAGE DENSITY

CROSS-REFERENCE TO RELATED APPLICATION

This application is a continuation of U.S. patent application Ser. No. 10/191,923 entitled "Apparatus and Method for Maximizing Equipment Storage Density," filed Jul. 9, 2002.

TECHNICAL FIELD

This invention relates generally to equipment enclosures, and is more particularly directed toward structures for maximizing the amount of equipment that may be stored by an equipment enclosure.

BACKGROUND

Equipment enclosures are used to store a wide variety of equipment. For example, equipment enclosures may be used to store electronic devices, such as personal computers, hubs, routers, and the like. An equipment enclosure may also be used to store equipment other than electronic devices, such as boxes, tools, medical supplies, and so forth. Equipment enclosures may sometimes be referred to as equipment racks, equipment cabinets, or the like.

Equipment enclosures are produced in differing widths to accommodate varying equipment requirements. One standard equipment enclosure is commonly referred to as a "19 inch rack," which denotes that the enclosure is designed to accommodate equipment with a standard width of 19 inches. Equipment that is to be stored in the enclosures may be designed to conform to industry standard dimensions. One standard dimension is referred to as "1 U," which equals 1.75 inches. Equipment to be stored in the enclosures may be made to have a height that is a multiple of 1 U. That is, equipment may be made to have a height of 1 U (1.75 inches), 2 U (3.50 inches), 3 U (4.25 inches), etc.

Equipment enclosures typically include four corner vertical mounting rails or two center vertical mounting rails. Vertical arrays of mounting holes or fastener mounting receptacles facilitate the retention of the equipment into the enclosure. Support shelves may be attached to the mounting rails via the mounting holes or receptacles, and equipment may be positioned on top of the support shelves. Some equipment enclosures include a housing that either partially or completely encloses the mounting rails.

One specific use of equipment enclosures is for storing a computer cluster. A computer cluster is a group of computers working together in a distributed computer system. Computer clusters are an increasingly popular alternative to more traditional computer architectures and supercomputers. Each individual computer of the cluster is typically referred to as a node. Nodes of a cluster work together as a single entity or in groups to cooperatively provide processing power and mass storage.

It is often desirable to maximize the amount of equipment that an equipment enclosure may store. One way to accomplish this is to utilize the area outside the region bounded by the vertical mounting rails. However, this area is left unused in known equipment enclosures.

SUMMARY OF THE INVENTION

A mounting mechanism for mounting a enclosure-mountable device to an equipment enclosure having a plurality of vertical mounting rails disposed so as to define an equipment storage region is disclosed. The mounting mechanism includes a first portion configured to be attached to the enclosure-mountable device, and a second portion configured to be attached to one or more of the vertical mounting rails. The first and second portions are configured such that the enclosure-mountable device may be disposed in a first position outside the equipment storage region and a second position outside the equipment storage region.

The mounting mechanism may also include a hinging mechanism configured to allow the enclosure-mountable device to rotate from the first position to the second position. In one embodiment, the hinging mechanism includes a slot in the first portion of the mounting mechanism, the slot including a first endpoint and a second endpoint disposed above the first endpoint in a vertical direction.

The mounting mechanism may also include a securing mechanism for securing the enclosure-mountable device in the second position. In one embodiment, the securing mechanism includes a female fastener attached to the second portion of the mounting mechanism. The female fastener is configured to receive a male fastener attached to the enclosure-mountable device. In another embodiment, the vertical mounting rail includes a female fastener that is configured to receive the male fastener.

The enclosure-mountable device may include a power port configured to be connected to a power port on an electronic device. The electronic device may take the form of a node in a computer cluster. In such an embodiment, the enclosure-mountable device may also include a monitoring port configured to be connected to a peripheral card that is connected to an expansion slot within the node, and a serial access port configured to be connected to a serial port within the node.

An equipment enclosure for storing a enclosure-mountable device is also disclosed. The equipment enclosure includes a plurality of vertical mounting rails disposed so as to define an equipment storage region, a enclosure-mountable device, and a mounting mechanism. The mounting mechanism includes a mounting benclosureet configured to attach the enclosure-mountable device to one or more of the vertical mounting rails such that the enclosure-mountable device is disposed outside the equipment storage region in a first position, a hinging mechanism configured to allow the enclosure-mountable device to be rotated from the first position to a second position, and a securing mechanism configured to secure the enclosure-mountable device in the second position.

A method for maximizing equipment storage density within an equipment enclosure having a plurality of vertical mounting rails disposed so as to define an equipment storage region is also disclosed. The method includes the steps of mounting a enclosure-mountable device to one or more of the vertical mounting rails such that the enclosure-mountable device is disposed outside the equipment storage region in a first position, rotating the enclosure-mountable device from a first position to a second position outside the equipment storage region, and securing the enclosure-mountable device in the second position.

BRIEF DESCRIPTION OF THE DRAWINGS

The present embodiments will become more fully apparent from the following description and appended claims, taken in conjunction with the accompanying drawings. Understanding that these drawings depict only typical embodiments and are, therefore, not to be considered limiting of the invention's scope, the embodiments will be described with additional specificity and detail through use of the accompanying drawings in which:

DETAILED DESCRIPTION

It will be readily understood that the components of the embodiments as generally described and illustrated in the Figures herein, could be arranged and designed in a wide variety of different configurations. Thus, the following more detailed description of the embodiments of the system and method of the present invention, as represented in the Figures, is not intended to limit the scope of the invention, as claimed, but is merely representative of the embodiments of the invention.

Figure 1:
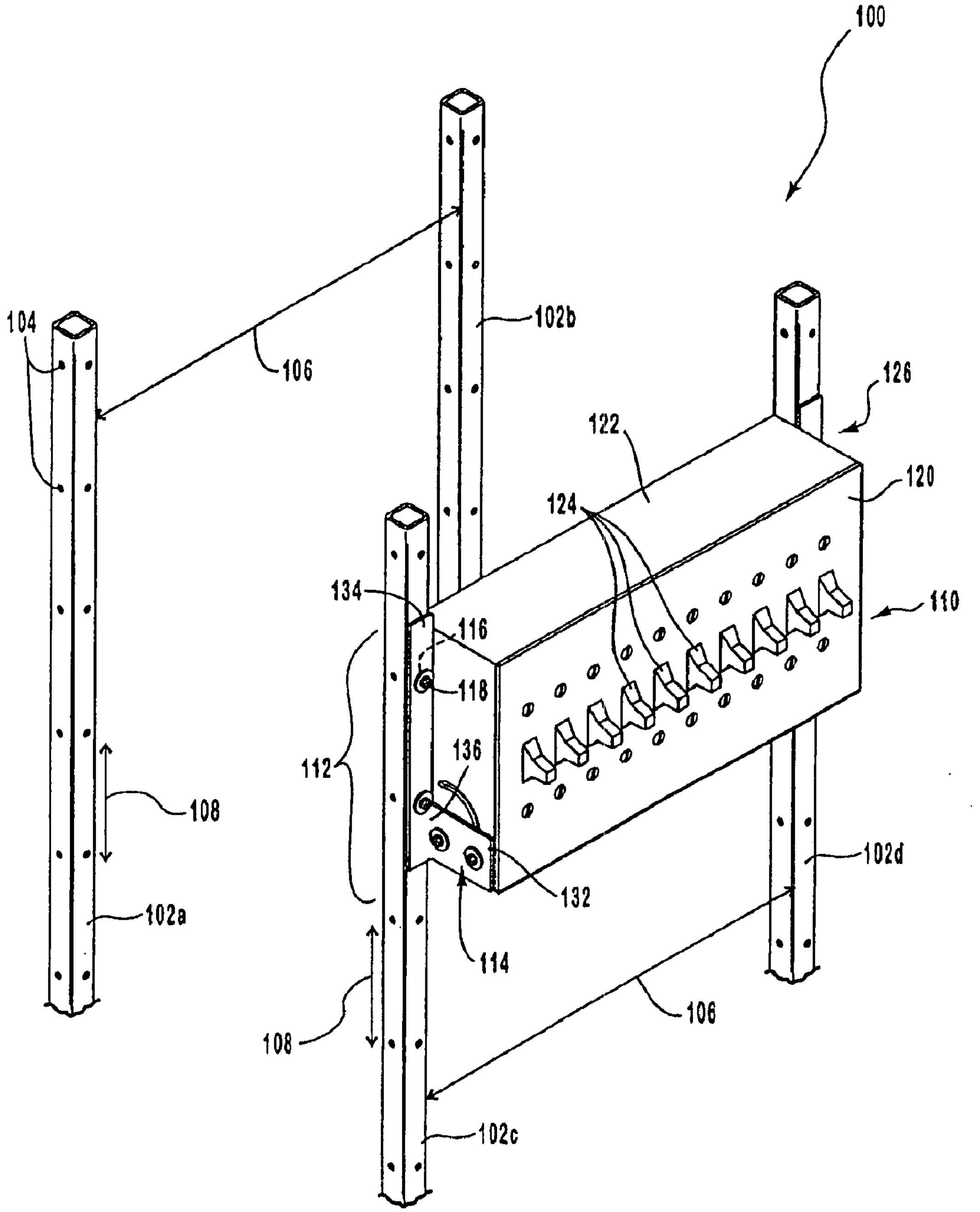
FIG. 1 is a perspective view of one embodiment of a mounting mechanism for mounting a enclosure-mountable device to an equipment enclosure.

FIG. 1 is a perspective view of a mounting mechanism 112 for mounting an enclosure-mountable device 110 to an equipment enclosure 100. The equipment enclosure 100 includes four mounting rails 102*a*, 102*b*, 102*c*, 102*d* which extend in a vertical direction 108. The mounting rails 102 may be made using standard manufacturing techniques known by those skilled in the art. Different types of materials may be used for the mounting rails 102 including a variety of plastics, metals, etc. The mounting rails 102 may include a plurality of mounting holes 104. The mounting holes 104 may be threaded in order to receive screws, threaded bolts, etc. Alternatively, the mounting rails 102 may accept threaded inserts that are configured to receive screws, threaded bolts, etc. In alternative embodiments, the equipment enclosure 100 may also include a housing that either partially or completely encloses the mounting rails 102.

Typically, the four vertical mounting rails 102 are disposed so as to define an equipment storage region. In particular, a plurality of support shelves (not shown) are typically attached to the mounting rails 102 so that the support shelves are disposed inside the region bounded by the mounting rails 102. Equipment then may be placed on top of the support shelves.

In FIG. 1, the mounting rails 102 form the corners of a rectangle, i.e., the region bounded by the vertical mounting rails 102 is rectangular in shape. However, any number of vertical mounting rails 102 may be used, and the mounting rails 102 may be disposed so as to form the corners, vertices, and/or endpoints of any desired shape.

The equipment enclosure 100 may be used to store a wide variety of equipment. For example, the equipment enclosure 100 may be used to store computers that are part of a computer cluster, i.e., a group of standalone computers working together in a distributed computing environment. Alternatively, a web site hosting provider may use the equipment enclosure 100 to store multiple computers which host the web sites of various companies, but which are not part of a cluster. Alternatively still, a telecommunications central office may use the equipment enclosure 100 to store hubs, routers, switches, and the like. The equipment enclosure 100 may also be used to store equipment other than electronic devices, such as boxes, tools, medical supplies, and so forth. Those skilled in the art will recognize many additional uses for the equipment enclosure 100 in light of the teachings contained herein.

It is often desirable to maximize the amount of equipment that is stored within the equipment enclosure 100. One way to accomplish this objective is to utilize the space in the equipment enclosure 100 that lies outside the equipment storage region, i.e., the region bounded by the mounting rails 102. In particular, a enclosure-mountable device 110 may be mounted to a subset of the mounting rails 102 by a mounting mechanism 112 such that it 110 is disposed outside the region typically occupied by the support shelves. In the embodiment shown in FIG. 1, the enclosure-mountable device 110 is mounted to the mounting rails 102*c*, 102*d*, such that it is disposed outside the equipment storage region.

The mounting mechanism 112 shown in FIG. 1 includes a mounting bracket 114. The mounting bracket 114 includes a first portion 132 and a second portion 134. The first and second portions 132, 134 are attached together at a knuckle 136 and disposed perpendicularly to one another. In alternative embodiments, the first and second portions 132, 134 may be disposed any desired direction relative to one another.

The first portion 132 is configured to be attached to the enclosure-mountable device 110, and the second portion 134 is configured to be attached to a mounting rail 102. In particular, both the first portion 132 and the second portion 134 include a plurality of mounting holes 116. Suitable fasteners 118, such as screws, bolts, etc., may be inserted through the mounting holes 116 to attach the first portion 132 to the enclosure-mountable device 110 and the second portion 134 to a mounting rail 102.

The mounting bracket 114 may be made using standard manufacturing techniques known by those skilled in the art. The first and second portions 132, 134 may be separate components joined together by a suitable fastening technique, such as (but not limited to) welding. Alternatively, the mounting bracket 114 may be made from a single piece of material that has been suitably shaped to form the first and second portions 132, 134. Different types of materials may be used for the mounting bracket 114 including a variety of plastics, metals, etc.

In the embodiment shown in FIG. 1, the enclosure-mountable device 110 may be used as a power distribution unit (PDU) for supplying or controlling the supply of power to a plurality of electronic devices (not shown). The PDU 110 includes a front side 120 and a back side 122. A plurality of switches 124 are disposed on the front side 120. Each switch 124 may control the supply of power to a single electronic device. Of course, the PDU 110 shown in FIG. 1 is exemplary only; in alternative embodiments, the enclosure-mountable device 110 may take many different forms. In one embodiment, the enclosure-mountable device 110 may be a cluster management apparatus (CMA) for monitoring individual computers in a cluster. Alternatively, the enclosure-mountable device 110 may be a device (e.g., a computer) that would otherwise be stored in the equipment enclosure 100 within the equipment storage region. Those skilled in the art will recognize numerous additional enclosure-mountable devices 110 in light of the teachings contained herein.

Figure 2:
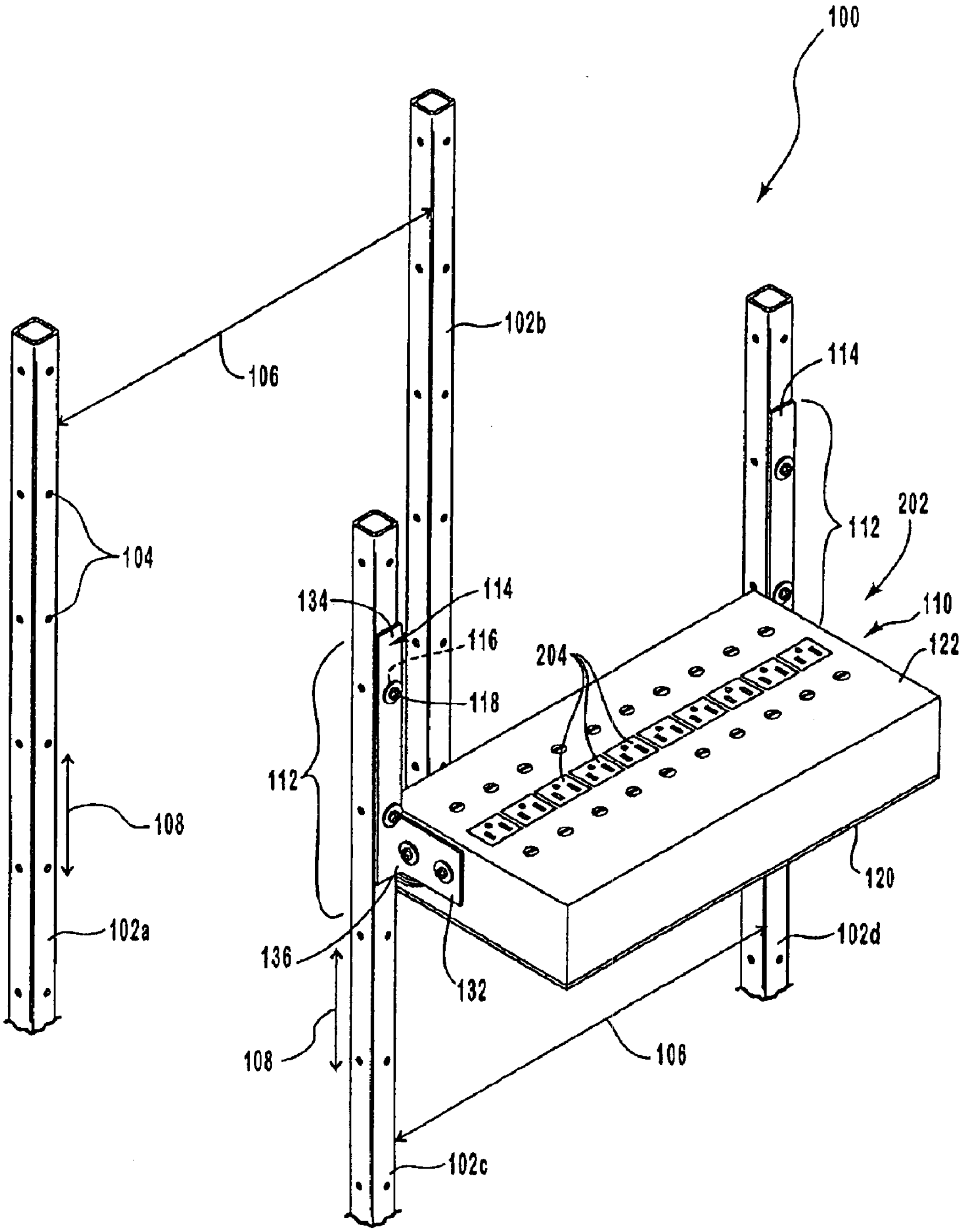
FIG. 2 is a perspective view of the enclosure-mountable device of FIG. 1 shown in its extended position.

The mounting mechanism 112 is configured to allow the enclosure-mountable device 110 to be disposed in an upright position 126 and an extended position 202. In FIG. 1, the enclosure-mountable device 110 is shown in its upright position 126, i.e., so that the front side 120 and the back side 122 are disposed vertically. FIG. 2 is a perspective view of a portion of the equipment enclosure 100 of FIG. 1 showing the enclosure-mountable device 110 mounted in its extended position 202. In particular, the enclosure-mountable device 110 is mounted to the mounting rails 102 such that the front side 120 and the back side 122 are disposed horizontally.

In the embodiment shown in FIGS. 1–2, moving the enclosure-mountable device 110 from its upright position 126 to its extended position 202 involves disengaging the fasteners 118 that attach the enclosure-mountable device 110 to the mounting bracket 114, repositioning the enclosure-mountable device 110 to its extended position 202, and reattaching the fasteners 118 as illustrated in FIG. 2.

As in FIG. 1, the enclosure-mountable device 110 shown in FIG. 2 takes the form of a PDU 110. The back side 122 of the PDU 110 includes a plurality of power ports or outlets 204 which are configured to distribute power to a plurality of electronic devices. Of course, as stated previously, the type of enclosure-mountable device 110 mounted to the mounting rails 102 may take many alternate forms.

Figure 3:
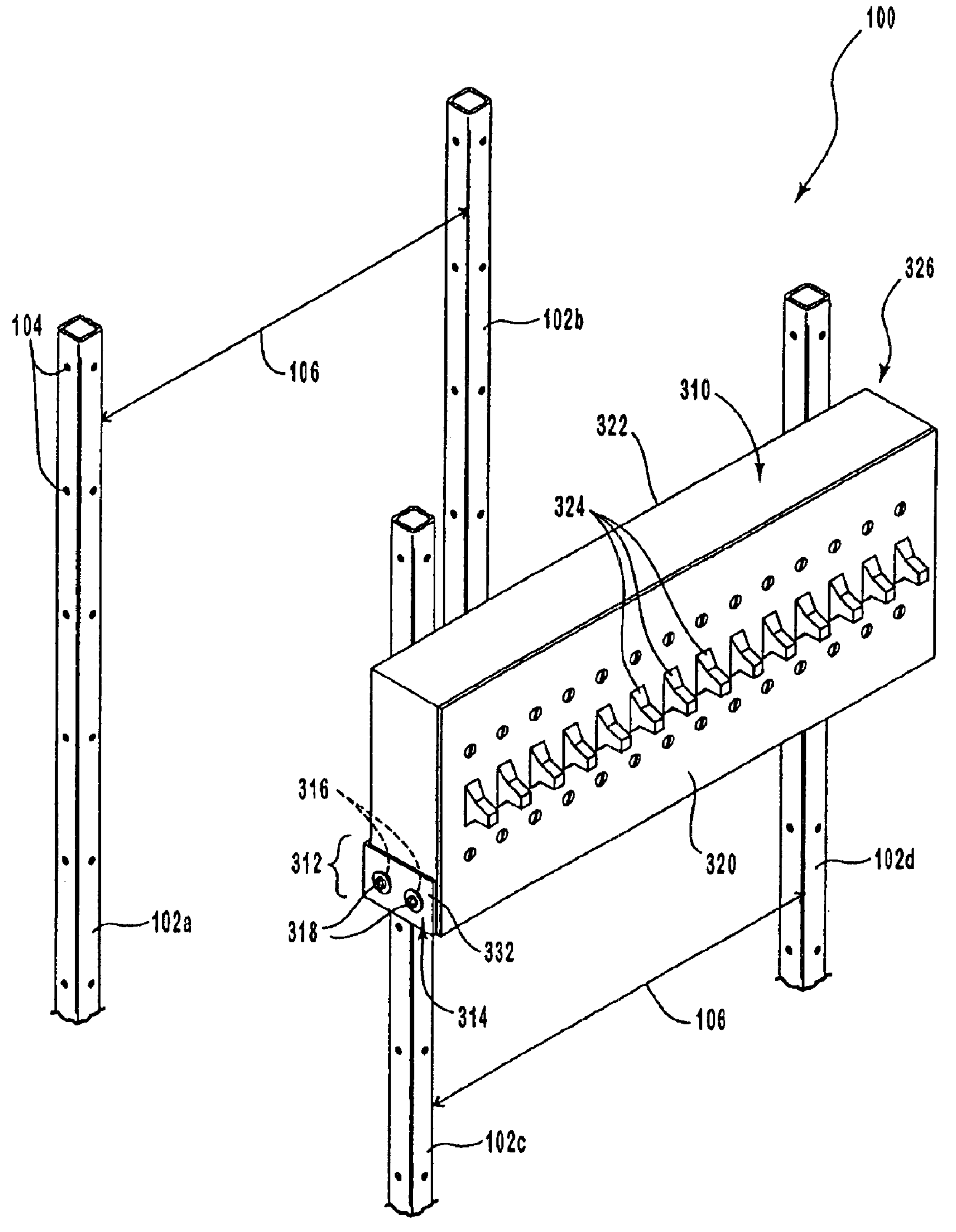
FIG. 3 is a perspective view of an alternative enclosure-mountable device mounted to an equipment enclosure.
Figure 4:
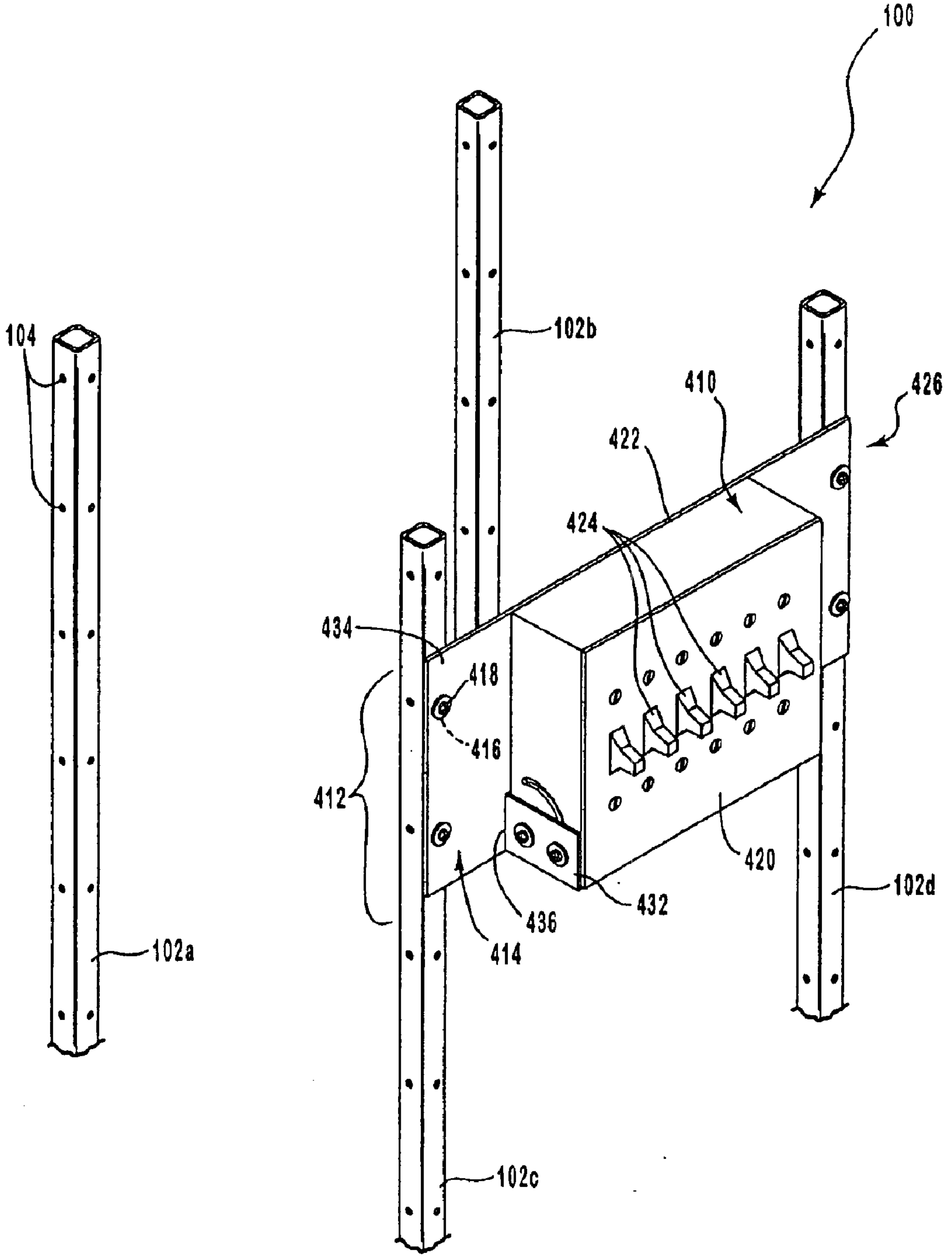
FIG. 4 is a perspective view of an alternative enclosure-mountable device mounted to an equipment enclosure.

In addition, the shape of the enclosure-mountable device 110 may vary. FIG. 3 is a perspective view of an alternative enclosure-mountable device 310 mounted in its upright position 326. The width of the enclosure-mountable device 310 is greater than the width of the equipment enclosure 100. The mounting bracket 314 is configured to accommodate the enclosure-mountable device 310. Similarly, FIG. 4 is a perspective view of another alternative enclosure-mountable device 410 mounted in its upright position 426. The width of the enclosure-mountable device 410 is smaller than the width of the equipment cabinet 100. The mounting bracket 414 is configured to accommodate the enclosure-mountable device 410. Of course, in addition to the enclosure-mountable devices explicitly shown, those skilled in the art will recognize any number of differently shaped enclosure-mountable devices in light of the teachings contained herein.

Figure 5:
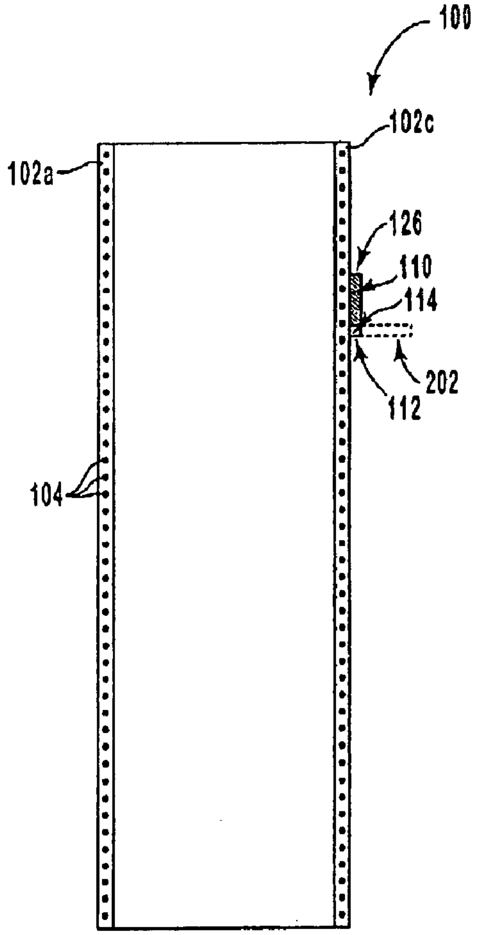
FIG. 5 is a side elevational view of a enclosure-mountable device mounted to an equipment enclosure by the mounting mechanism of FIG. 1.

FIG. 5 is a side elevational view of the enclosure-mountable device 110 mounted to the equipment enclosure 100 by the mounting mechanism 112. As illustrated previously, the mounting mechanism 112 is configured so that the enclosure-mountable device 110 may be moved from an upright position 126 to an extended position 202, and vice versa. Whether in its upright position 126 or its extended position 202, the enclosure-mountable device 110 is disposed outside the equipment storage region (i.e., the region bounded by the mounting rails 102).

Figure 6:
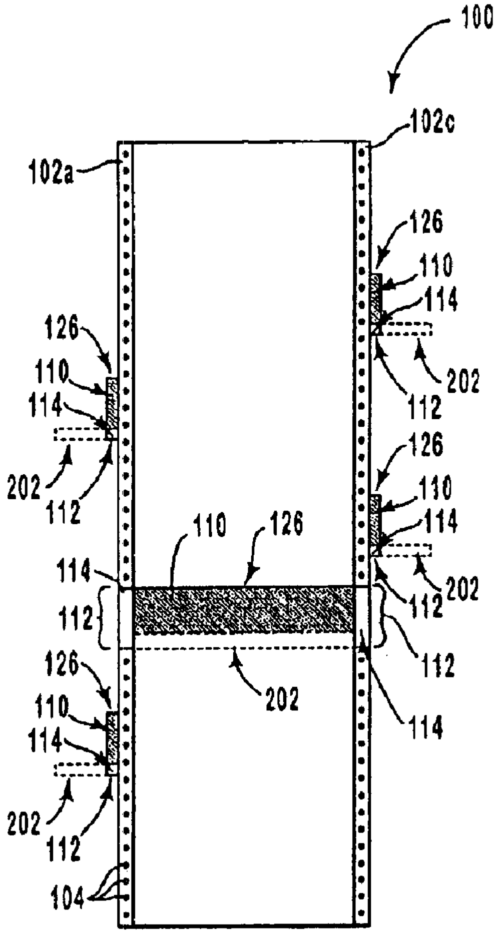
FIG. 6 is a side elevational view of multiple enclosure-mountable devices mounted to an equipment enclosure by the mounting mechanism of FIG. 1.

In FIG. 5, only one enclosure-mountable device 110 is mounted to the equipment enclosure 100. As shown in FIG. 6, however, multiple enclosure-mountable devices 110 may be mounted to the equipment enclosure 100. The enclosure-mountable devices 110 may be mounted at different heights and on different sides of the equipment enclosure 100. The enclosure-mountable devices 110 may be in communication with one another, or they may function separately.

Figure 7:
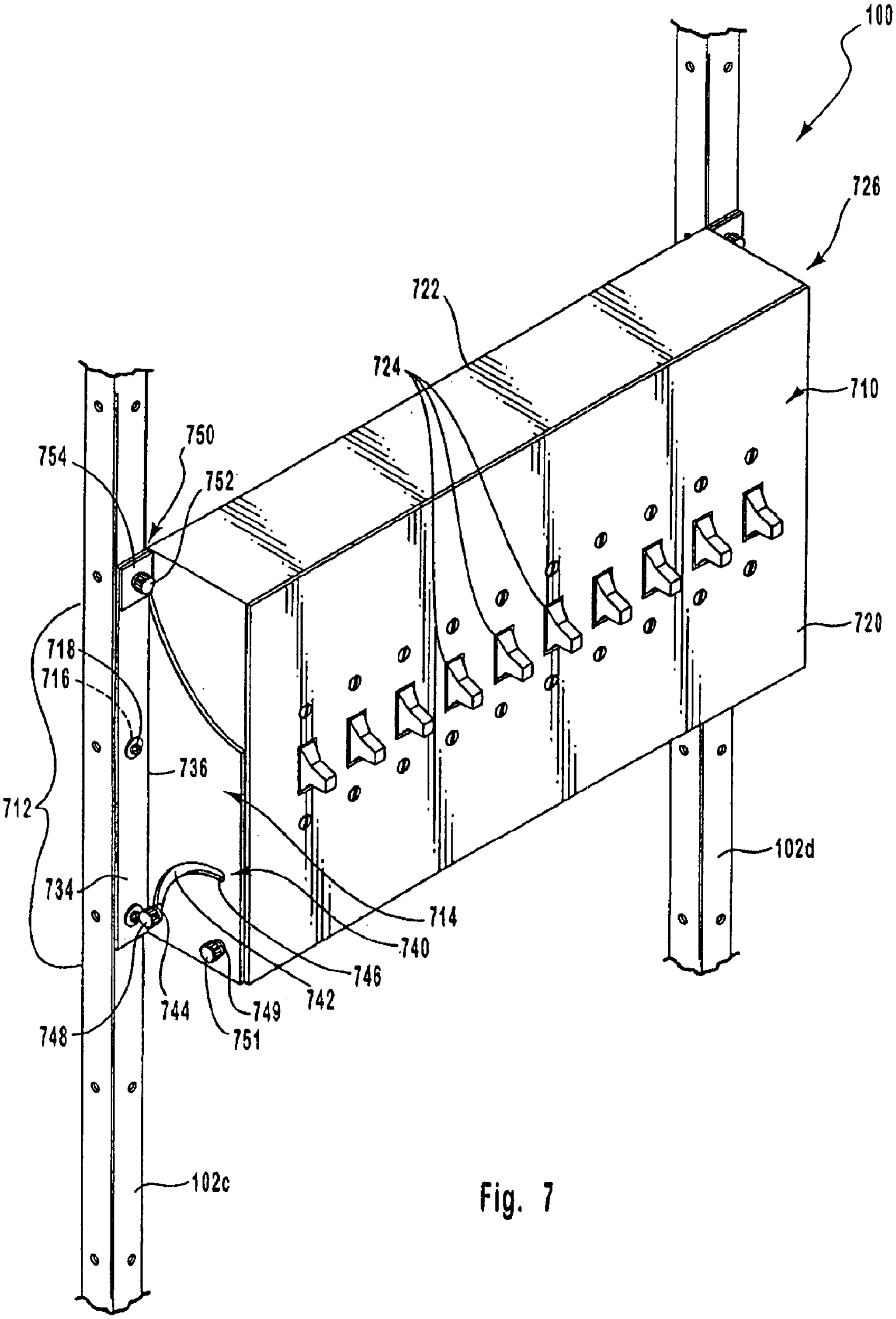
FIG. 7 is a perspective view of an alternative mounting mechanism for mounting a enclosure-mountable device to an equipment enclosure.

FIG. 7 is a perspective view of an alternative mounting mechanism 712 for mounting a enclosure-mountable device 710 to the equipment enclosure 100. Elements of the enclosure-mountable device 710 of FIG. 7 that correspond to elements of the enclosure-mountable device 110 of FIG. 1 are labeled with similar reference numbers. For example, the front side 120 of the enclosure-mountable device 110 in FIG. 1 corresponds to the front side 720 of the enclosure-mountable device 710 in FIG. 7.

In the embodiments shown previously, the mounting mechanism 112 did not allow the enclosure-mountable device 110 to freely rotate from its upright position 126 to its extended position 202. Instead, to move the enclosure-mountable device from one position to another, the enclosure-mountable device 110 was unattached from the mounting mechanism 112 and reattached in the desired position. In the embodiment shown in FIG. 7, the mounting mechanism 712 includes a hinging mechanism 740 configured to allow the enclosure-mountable device 710 to rotate from its upright position 726 to its extended position 802 (shown in FIG. 8).

As with the embodiment described previously, the mounting mechanism 712 includes a mounting bracket 714. The mounting bracket 714 includes a first portion 732 and a second portion 734. The first and second portions 732, 734 are attached together at a knuckle 736 and disposed perpendicularly to one another. The first portion 732 is configured to be attached to the enclosure-mountable device 710, and the second portion 734 is configured to be attached to a mounting rail 102. In particular, both the first portion 732 and the second portion 734 include a plurality of mounting holes 716. Suitable fasteners 718, such as screws, bolts, etc., may be inserted through the mounting holes 716 to attach the first portion 732 to the enclosure-mountable device 710 and the second portion 734 to a mounting rail 102.

The mounting mechanism 712 includes a hinging mechanism 740. The hinging mechanism 740 includes a slot 742 and an opening 749 in the first portion 732 of the mounting bracket 714. The slot 742 includes a first endpoint 744 and a second endpoint 746. The hinging mechanism 740 also includes a first cylindrical pin 748 and a second cylindrical pin 751. The second cylindrical pin 751 may also be referred to as a pivot pin 751. The first cylindrical pin 748 is attached to the enclosure-mountable device 710 so as to engage the slot 742. When the enclosure-mountable device 710 is in its upright position 726, the first cylindrical pin 748 rests in the first endpoint 744. When the enclosure-mountable device 710 is in its extended position 802, the first cylindrical pin 748 rests in the second endpoint 746. The pivot pin 751 is attached to the enclosure-mountable device so as to engage the opening 749. The pivot pin 751 allows the enclosure-mountable device 710 to be freely rotated from its upright position 726 to its extended position 802.

The mounting mechanism 712 also includes a securing mechanism 750 for securing the enclosure-mountable device 710 in its upright position 726. The securing mechanism 750 includes a female fastener 806 (shown in FIG. 8) in the second portion 734. In an alternative embodiment, one of the mounting holes 104 in a mounting rail 102 may serve as the female fastener 806. The female fastener 806 may be configured to receive a male fastener 752 that is attached to the enclosure-mountable device 710. In one embodiment, the female fastener 806 may take the form of a threaded protrusion, and the male fastener 752 may take the form of a threaded screw 752. The male fastener 752 may be attached to a plate 754 that is attached to the enclosure-mountable device 710. When the enclosure-mountable device is placed in its upright position 726, the male fastener 752 may be secured to the female fastener 806 to hold the enclosure-mountable device 710 in place.

Both the cylindrical pin 748 and the plate 754 may be an integral part of the enclosure-mountable device 110. Alternatively, the cylindrical pin 748 and the plate 754 may be separate components that are attached to the enclosure-mountable device 710 using any number of standard techniques, such as (but not limited to) welding.

Figure 8:
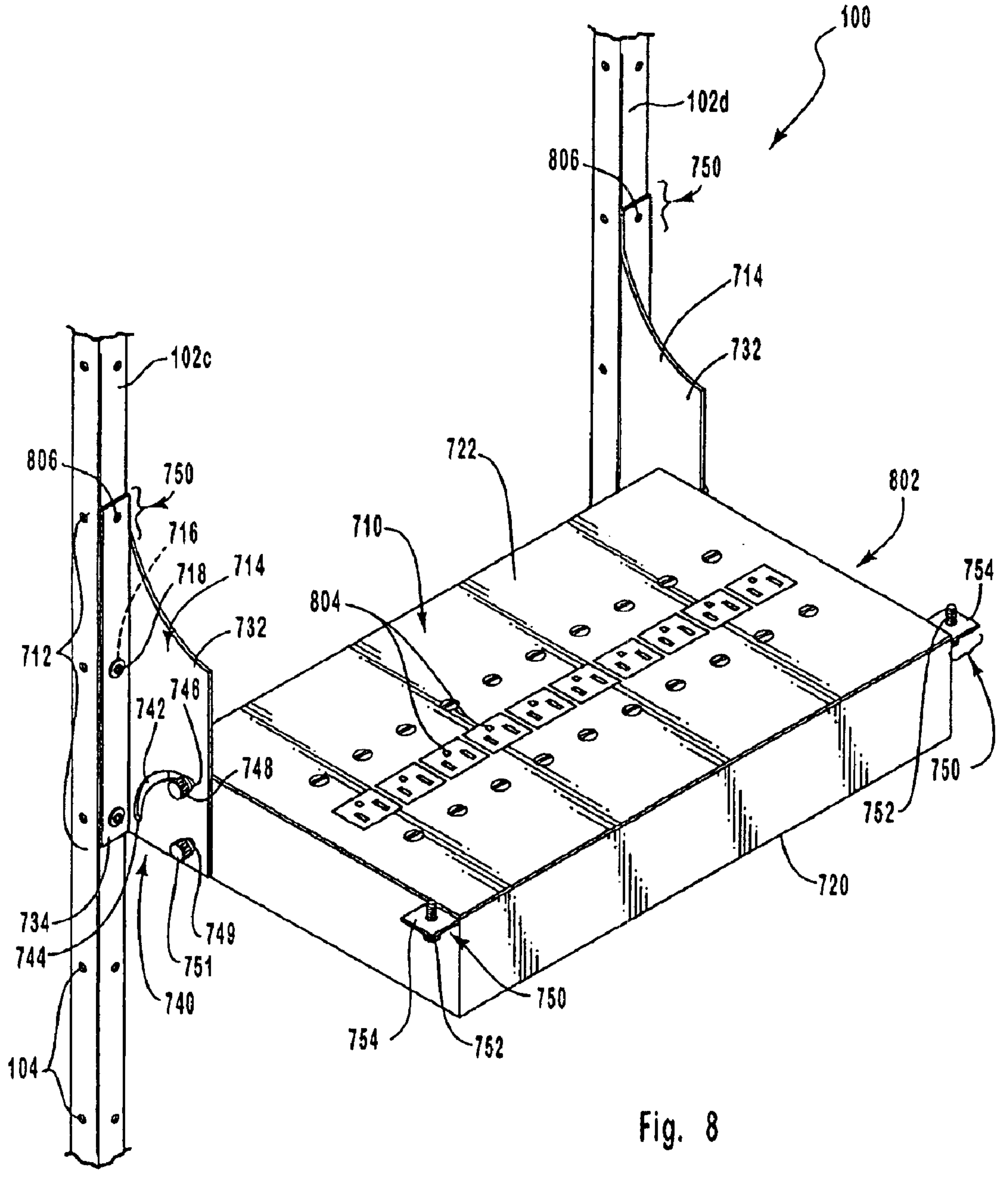
FIG. 8 is a perspective view of the enclosure-mountable device of FIG. 7 shown in its extended position.

FIG. 8 is a perspective view of the enclosure-mountable device 710 of FIG. 7 shown in its extended position 802. In particular, the enclosure-mountable device 710 has been moved so that the first cylindrical pin 748 rests in the second endpoint 746 of the slot 742. The second endpoint 746 prevents the first cylindrical pin 748, and therefore the enclosure-mountable device 710, from moving any farther in a downward direction.

Figure 9:
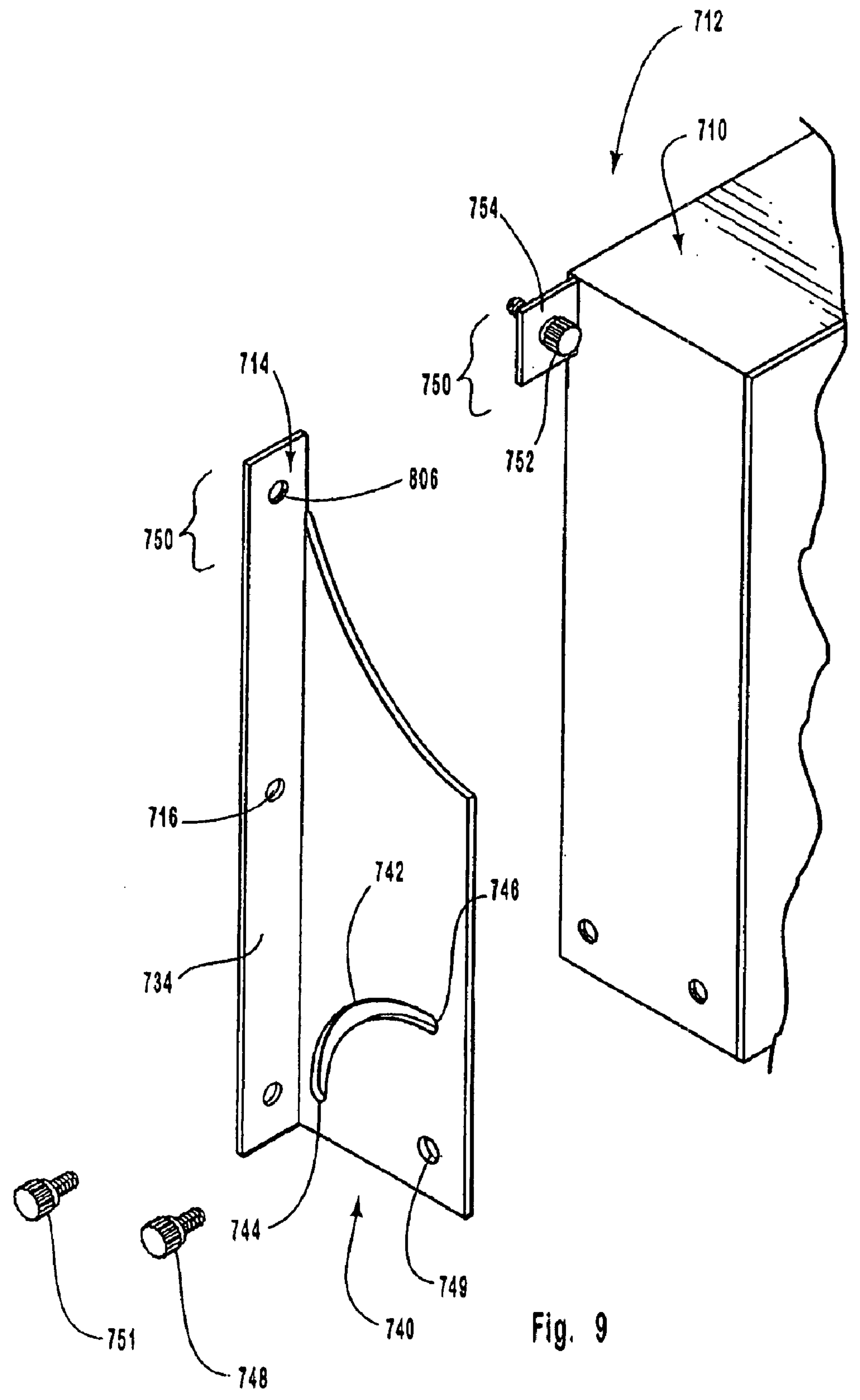
FIG. 9 is a perspective view of the mounting mechanism of FIGS. 7–8.

FIG. 9 is a perspective view of each of the sections of the mounting mechanism 712 of FIGS. 7–8. In particular, the mounting bracket 714, hinging mechanism 740, and securing mechanism 750 are each shown, along with the individual components that make up these sections.

Figure 10:
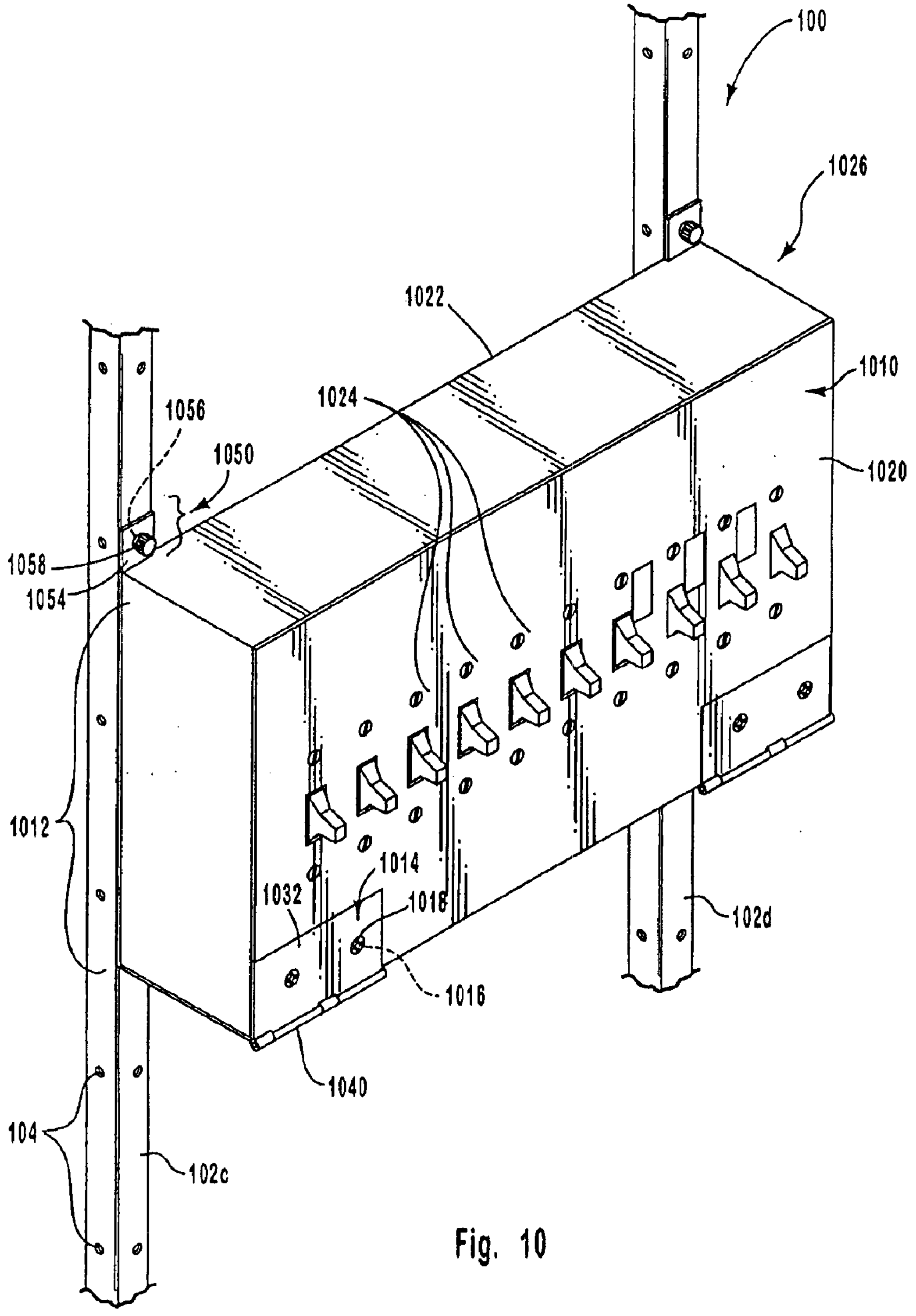
FIG. 10 is a perspective view of an alternative mounting mechanism for mounting a enclosure-mountable device to an equipment enclosure.

FIG. 10 is a perspective view of another alternative mounting mechanism 1012 for mounting a enclosure-mountable device 1010 to the equipment enclosure 100. Elements of the enclosure-mountable device 1010 of FIG. 10 that correspond to elements of the enclosure-mountable device 110 of FIG. 1 are labeled with similar reference numbers. For example, the front side 120 of the enclosure-mountable device 110 in FIG. 1 corresponds to the front side 1020 of the enclosure-mountable device 1010 in FIG. 10.

Figure 11:
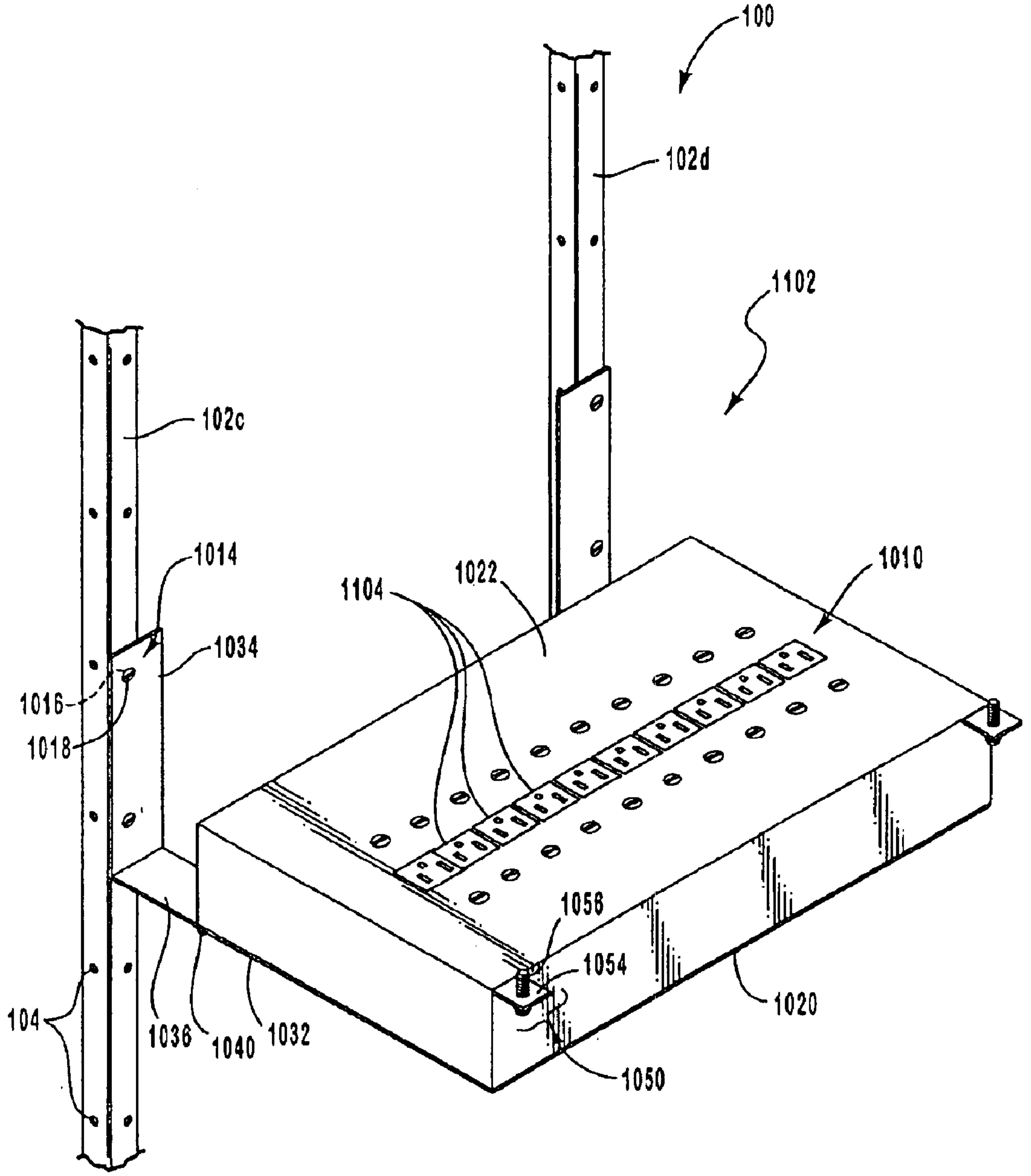
FIG. 11 is a perspective view of the enclosure-mountable device of FIG. 10 shown in its extended position.

Like the embodiment shown in FIGS. 7–9, the enclosure-mountable device 1010 shown in FIG. 10 may be rotated from its upright position 1026 to its extended position 1102 (shown in FIG. 11). However, the mounting mechanism 1012 has an alternative hinging mechanism 1040 and an alternative securing mechanism 1050 from those illustrated in FIGS. 7–9.

The mounting mechanism 1012 includes a mounting bracket 1014. In addition to a first portion 1032 and a second portion 1034 (shown in FIG. 11), the mounting bracket 1014 also includes a third portion 1036 (shown in FIG. 11). The first portion 1032 is configured to be attached to the enclosure-mountable device 1010, and the second portion 1034 is configured to be attached to a mounting rail 102. In particular, the mounting bracket 1014 includes a plurality of mounting holes 1016. Suitable fasteners 1018, such as screws, bolts, etc., may be inserted through the holes 1016 to attach the mounting bracket 1014 to the enclosure-mountable device 1010 and to the mounting rails 102.

The mounting bracket 1014 includes a hinging mechanism 1040. The hinging mechanism 1040 takes the form of a 180° hinge 1040 that connects the first portion 1032 and the third portion 1036. The 180° hinge 1040 is a standard, off-the-shelf component that may be purchased from a variety of suppliers well-known to those skilled in the art. The 180° hinge 1040 allows the first portion 1032 to be rotated upward so that the enclosure-mountable device 1010 is in its upright position 1026.

The mounting mechanism 1012 also includes an alternate securing mechanism 1050 from that described previously. The securing mechanism 1050 includes a flange 1054 that is attached to the enclosure-mountable device 1010. The flange 1054 may be an integral part of the enclosure-mountable device 1010. Alternatively, the flange 1054 may be a separate component that is attached to the enclosure-mountable device 1010 using any number of standard techniques, such as (but not limited to) welding. The flange 1054 is configured to be attached to a mounting rail 102. In particular, the flange 1054 includes a mounting hole 1056. Suitable fasteners 1058, such as screws, bolts, etc., may be used to attach the flange 1054 to the mounting rail 102, thereby securing the enclosure-mountable device 1010 in its upright position 1026.

FIG. 11 is a perspective view of the enclosure-mountable device 1010 of FIG. 10 shown in its extended position 1102. In particular, the first portion 1032 has been rotated about the 180° hinge 1040 so that it 1032 is disposed in a substantially horizontal direction. The 180° hinge 1040 prevents the enclosure-mountable device 1010 from moving any farther in a downward direction.

Figure 12:
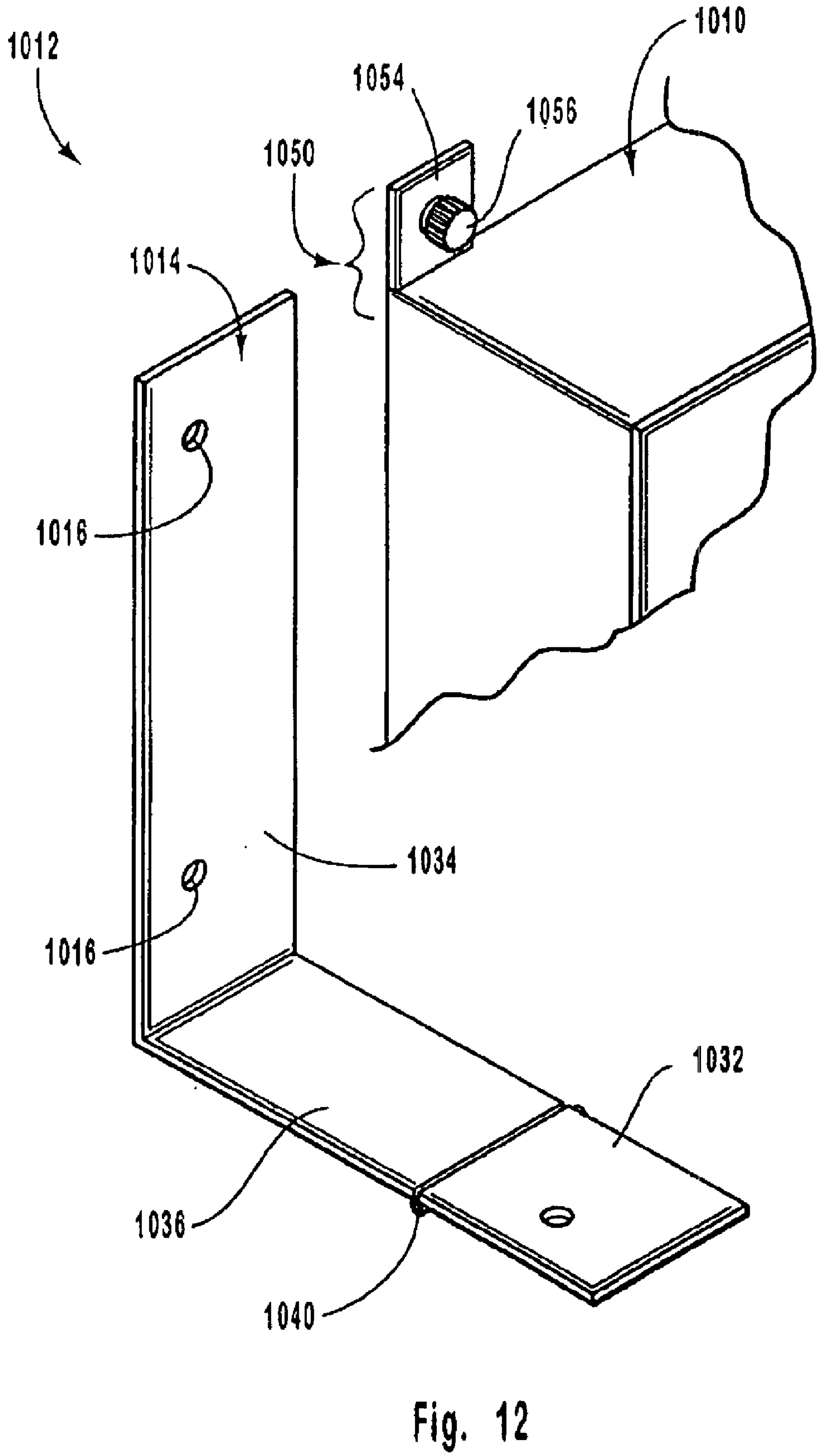
FIG. 12 is a perspective view of the mounting mechanism of FIGS. 10–11.

FIG. 12 is a perspective view of each of the sections of the mounting mechanism 1012 of FIGS. 10–11. In particular, the mounting bracket 1014, hinging mechanism 1040, and securing mechanism 1050 are each shown, along with the individual components that make up these sections.

As stated previously, the equipment enclosure 100 may be used to store computers that are part of a computer cluster, i.e., a group of standalone computers working together in a distributed computing environment. Where a computer is part of a cluster, it may be referred to as a node. Thus, as used herein, the term “node” refers to a computer, although the term “computer” does not necessarily refer to a node.

Figure 13:
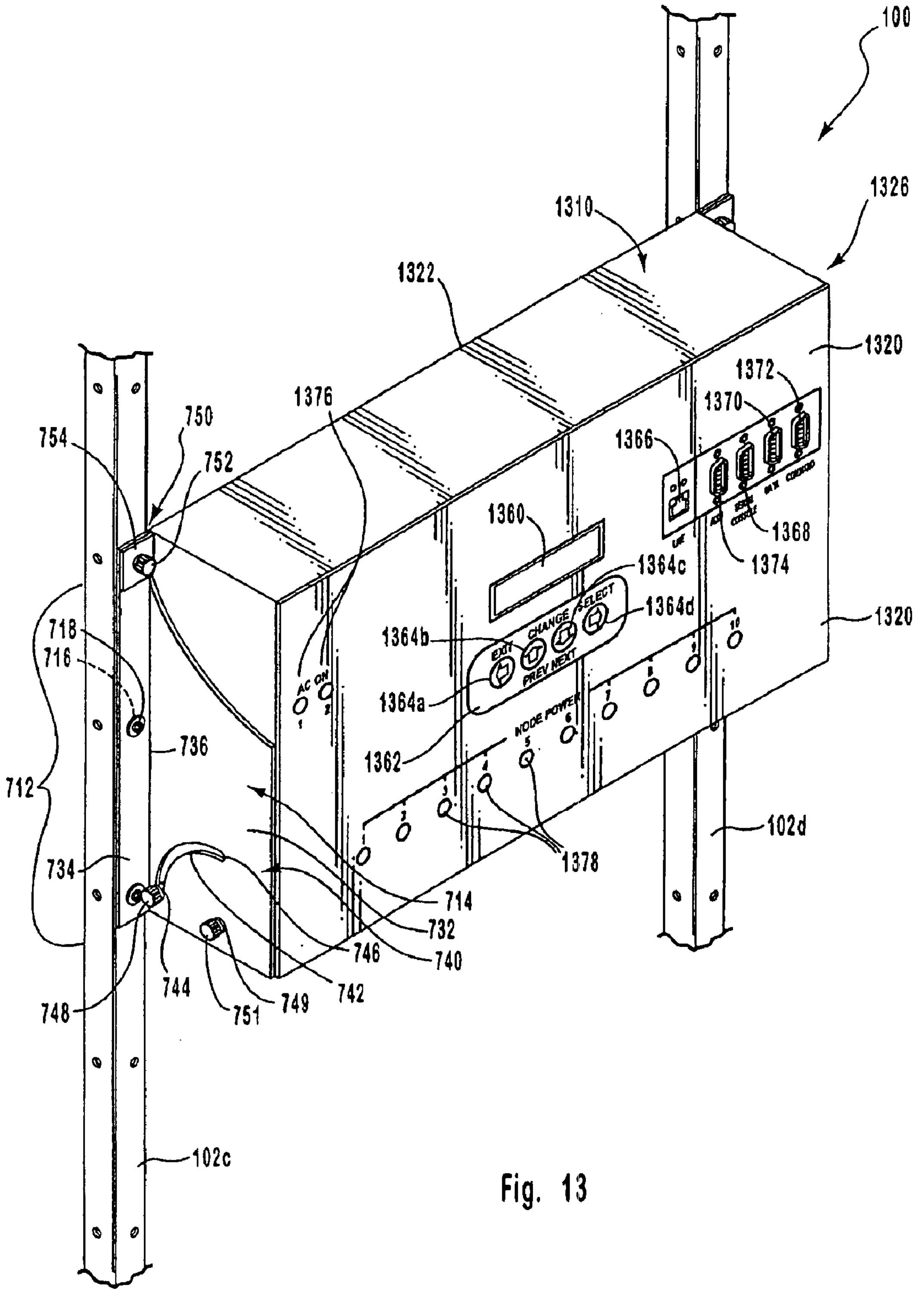
FIG. 13 is a perspective view of a cluster management apparatus mounted to an equipment enclosure by the mounting mechanism of FIGS. 7–9.

Also as stated previously, the enclosure-mountable device 110 may take the form of a cluster management apparatus (CMA) for monitoring the individual nodes within a cluster. FIG. 13 is a perspective view of a CMA 1310 mounted to the equipment enclosure 100 using the mounting mechanism 712 illustrated in FIGS. 7–9 and shown in its upright position 1326.

The CMA 1310 allows administrators of the cluster to monitor and control node functions. In the embodiment shown in FIG. 13, the CMA 1310 is configured to be connected to up to 10 nodes (not shown in FIG. 13). Of course, this number is exemplary only; in alternative embodiments any desired number of nodes may be connected to the CMA 1310. The CMA 1310 may also be connected to auxiliary devices (not shown), such as an uninterruptible power supply, a switch, and the like. In the embodiment shown in FIG. 13, the CMA 1310 may be connected to up to 2 auxiliary devices. Once again, however, this number is exemplary only; in alternative embodiments any desired number of auxiliary devices may be connected to the CMA 1310.

The front side 1320 of the CMA 1310 includes a user interface configured to allow a user to obtain information about one or more nodes. In particular, the front side 1320 of the CMA 1310 includes a display screen 1360. The display screen 1360 may take the form of an LCD display screen. Information about one or more nodes may be displayed on the display screen 1360. The CMA 1310 also includes a keypad 1362. The keypad 1362 includes a plurality of buttons 1364*a–d* which allow a user to cycle through a variety of user options on the display screen 1360.

In the embodiment shown in FIG. 13, the CMA 1310 also includes a network port 1366, a serial console port 1368, a data port 1370, a command port 1372, and an auxiliary port 1374. The network port 1366 allows the CMA 1310, and therefore each node within the cluster, to be connected to a network (e.g., a local area network, wide area network, the Internet, etc.). The serial console port 1368 allows the CMA 1310 to be connected to a console (not shown). This allows users to manage and configure the CMA 1310 via a command line interface. The data port 1370 outputs the data obtained from the serial access ports within each node. The command port 1372 may be connected to a computer, thereby allowing communication between the CMA 1310 and cluster management software (e.g., ClusterWorX, which is available from Linux NetworX in Sandy, Utah). The auxiliary port 1374 allows the CMA 1310 to be connected to an auxiliary device.

The CMA 1310 also includes a plurality of power indicator lights 1376, 1378. The power indicator lights 1376 indicate whether power is being supplied to the CMA 1310. The power indicator lights 1378 indicate whether the CMA 1310 is supplying power to a particular node.

Figure 14:
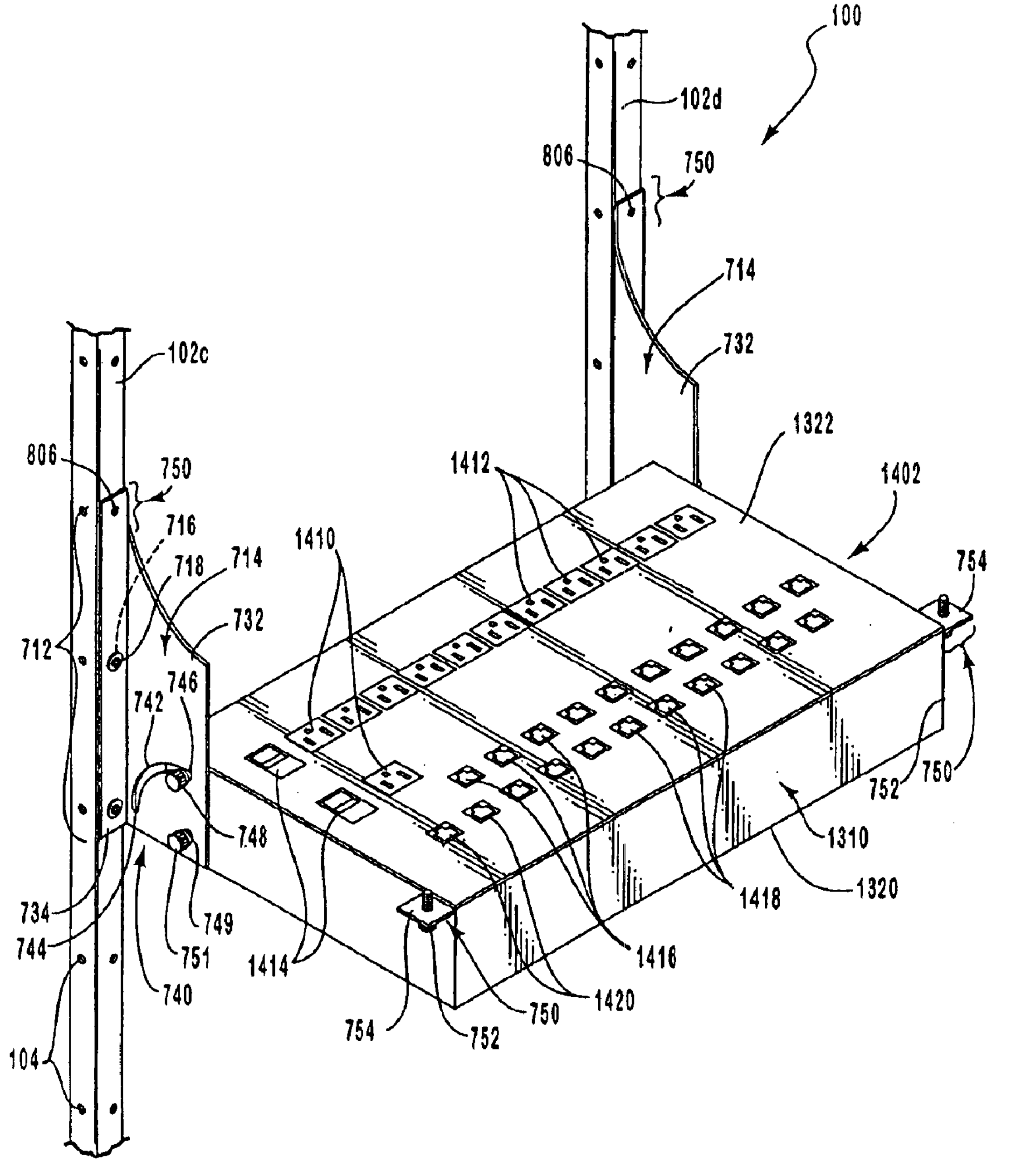
FIG. 14 is a perspective view of the enclosure-mountable device of FIG. 13 shown in its extended position.

FIG. 14 is a perspective view of the CMA 1310 mounted to the equipment enclosure 100 using the mounting mechanism 712 illustrated in FIGS. 7–9 and shown in its extended position 1402. The back side 1322 of the CMA 1310 includes a plurality of power ports 1410. The power ports 1410 may be configured to receive power from a standard 110 V electronic outlet. This power may then be distributed to nodes within the cluster through a plurality of power ports 1412. In the embodiment shown in FIG. 14, there are enough power ports 1412 to supply power to up to 10 nodes and up to 2 auxiliary devices. The switches 1414 allow power to the CMA 1310 to be toggled on and off.

The CMA 1310 also includes a plurality of monitoring ports 1416, each monitoring port 1416 being configured to be in communication with a node within the cluster. The monitoring ports 1416 may be used to access information about the nodes. In one embodiment, the monitoring ports 1416 may be connected to a peripheral card that is plugged into an expansion slot within each node. The peripheral card may be configured to detect information about each node, such as the temperature of one or more components (e.g., the CPU). The peripheral card may also be configured to reset (i.e., reboot) each node. The monitoring ports 1416 may also be used to access information about one or more auxiliary devices in a similar fashion.

The CMA 1310 also includes a plurality of serial access ports 1418, each serial access port 1418 being configured to be in communication with a serial port within a node. The serial ports within each node may output error information about the node. The serial access ports 1418 allow a user to access this information. In one embodiment, the serial access ports 1418 are configured to be compatible with the RS-232 standard.

The CMA 1310 also includes two linking ports 1420 that allow multiple CMAs 1310 to be linked together. In one embodiment, the linking ports 1420 are configured to be compatible with the RS-485 standard.

Figure 15:
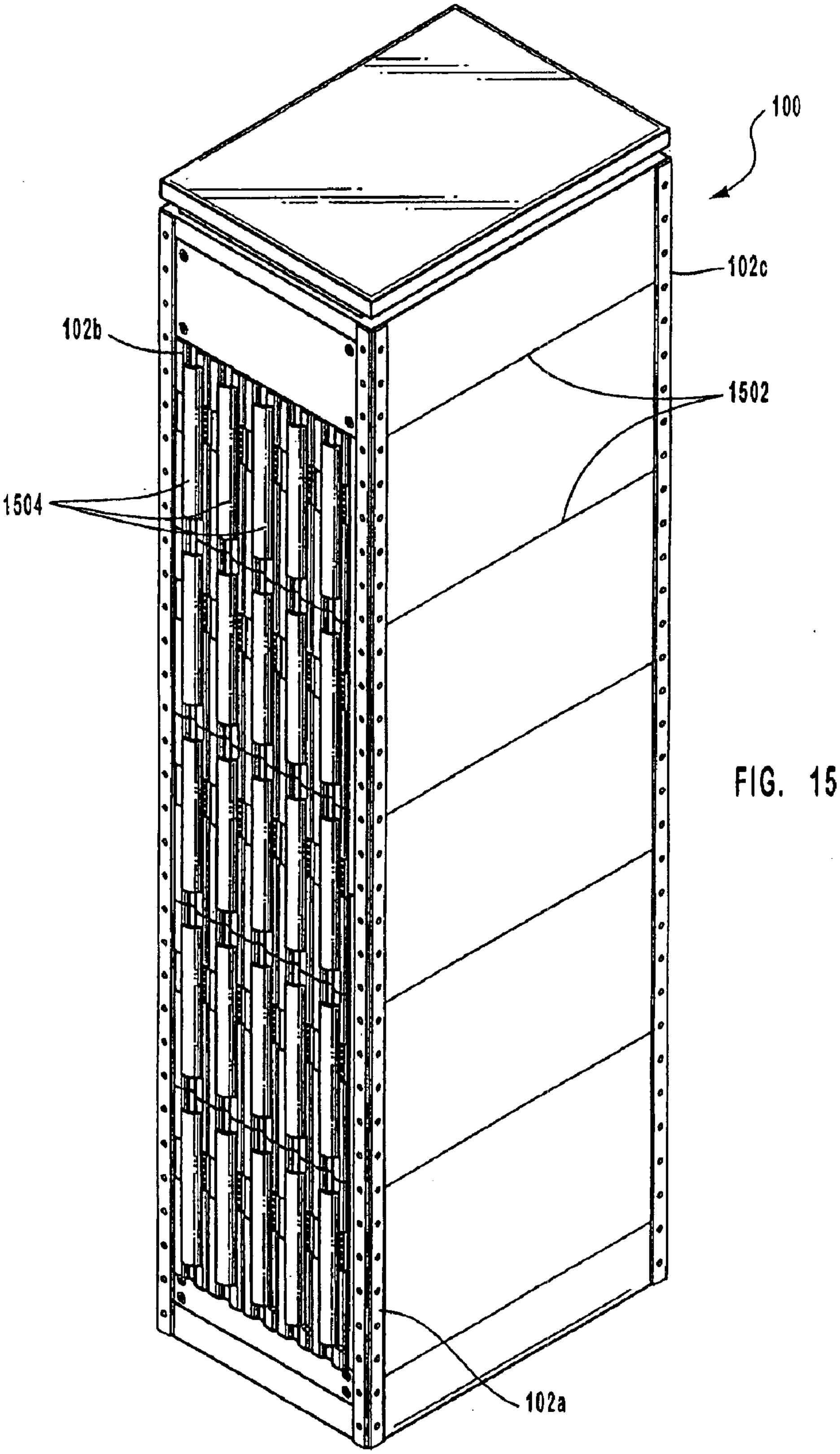
FIG. 15 is a perspective view of an equipment enclosure with a plurality of nodes stored therein.

FIG. 15 is a perspective view of an embodiment of the equipment enclosure 100 with a plurality of support shelves 1502 attached to the mounting rails 102 and a plurality of vertical nodes 1504 stored therein. The support shelves 1502, and therefore the nodes 1504, are disposed within the equipment storage region 102. Each support shelf 1502 is substantially planar. Different types of materials may be used for the support shelves 1502 including a variety of plastics, metals, etc. The support shelves 1502 may be secured to the mounting rails 102 in any number of ways. In one embodiment, the support shelves 1502 include flanges that may be attached to the mounting rails 102. In another embodiment, two support shelves 1502 are connected together by two side walls, forming a sub enclosure. The side walls may then be fastened to the mounting rails 102. Those skilled in the art will recognize a variety of other configurations for the support shelves 1502.

In the embodiment shown in FIG. 15, five support shelves 1502 are attached to the mounting rails 102 of the equipment enclosure 100, and five nodes 1504 are stored on each support shelf 1502. Of course, in alternative embodiments, any number of support shelves 1502 and/or nodes 1504 may be utilized.

Figure 16:
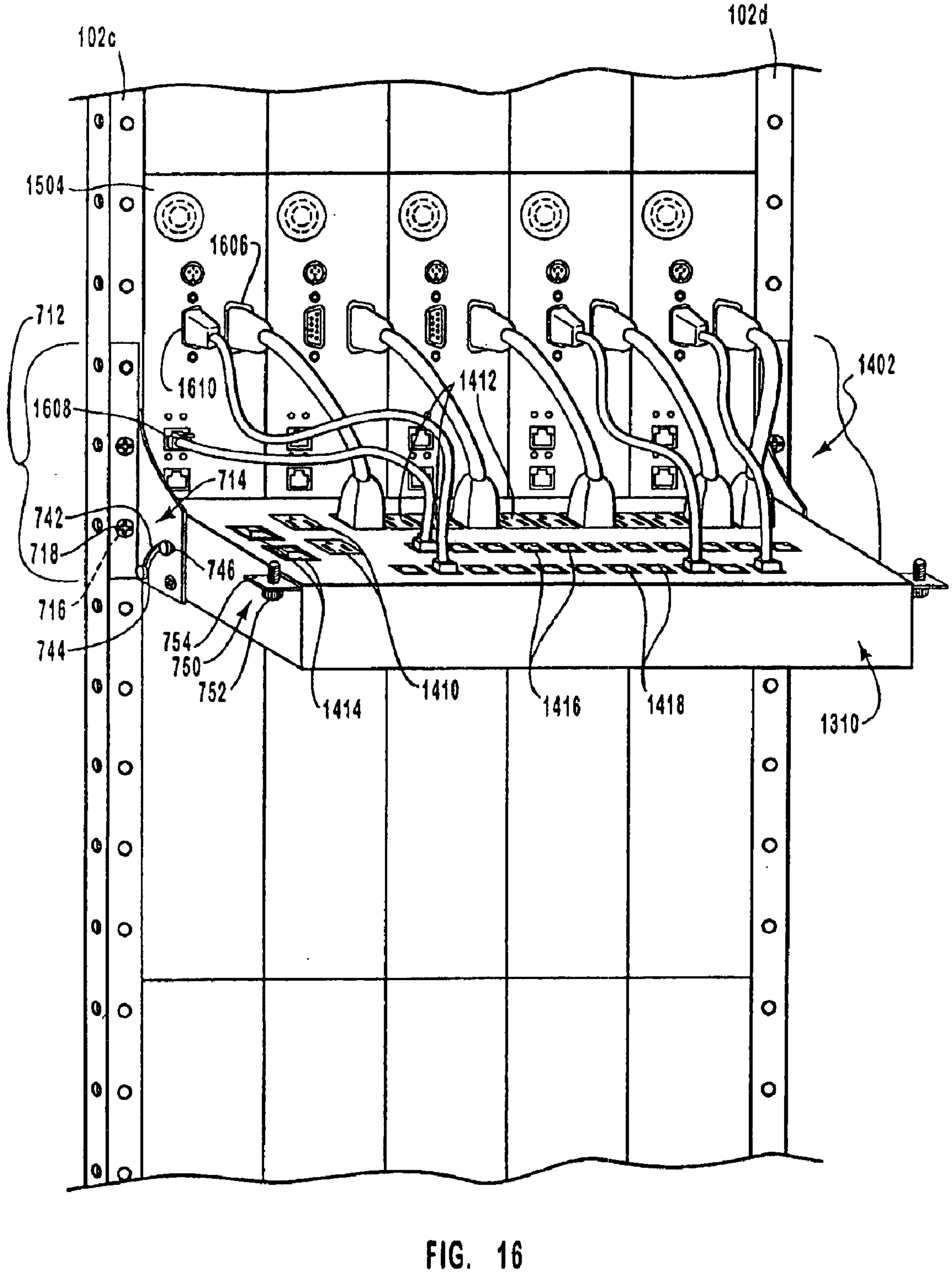
FIG. 16 is a perspective view of a cluster management apparatus connected to a plurality of nodes and shown in its extended position.

FIG. 16 is a perspective view of the CMA 1310 attached to the equipment enclosure 100 using the mounting mechanism 712 and connected to a plurality of nodes 1504. Each node 1504 may include a power port 1606, an expansion slot 1608 (e.g., a PCI expansion slot 1608), and a serial port 1610. The power port 1606 within each node 1504 is connected to a power port 1412 on the CMA 1310. A peripheral card (not shown) in the expansion slot 1608 within each node 1504 is connected to a monitoring port 1416 on the CMA 1310. The serial port 1610 within each node 1504 is connected to a serial access port 1418 on the CMA 1310. Of course, the types of ports illustrated in each node 1504, and the configuration of those ports, is exemplary only. Those skilled in the art will recognize a variety of other types and configurations of ports for the nodes 1504.

In FIG. 16, the CMA 1310 is shown in its extended position 1402. The extended position 1402 allows a user to temporarily work on the CMA 1310 without completely removing it 1310 from the equipment enclosure 100. For example, a user may wish to place the CMA 1310 in its extended position 1402 in order to connect the various ports within the nodes 1504 to various ports on the CMA 1310, or to connect the CMA 1310 to other CMAs 1310.

Figure 17:
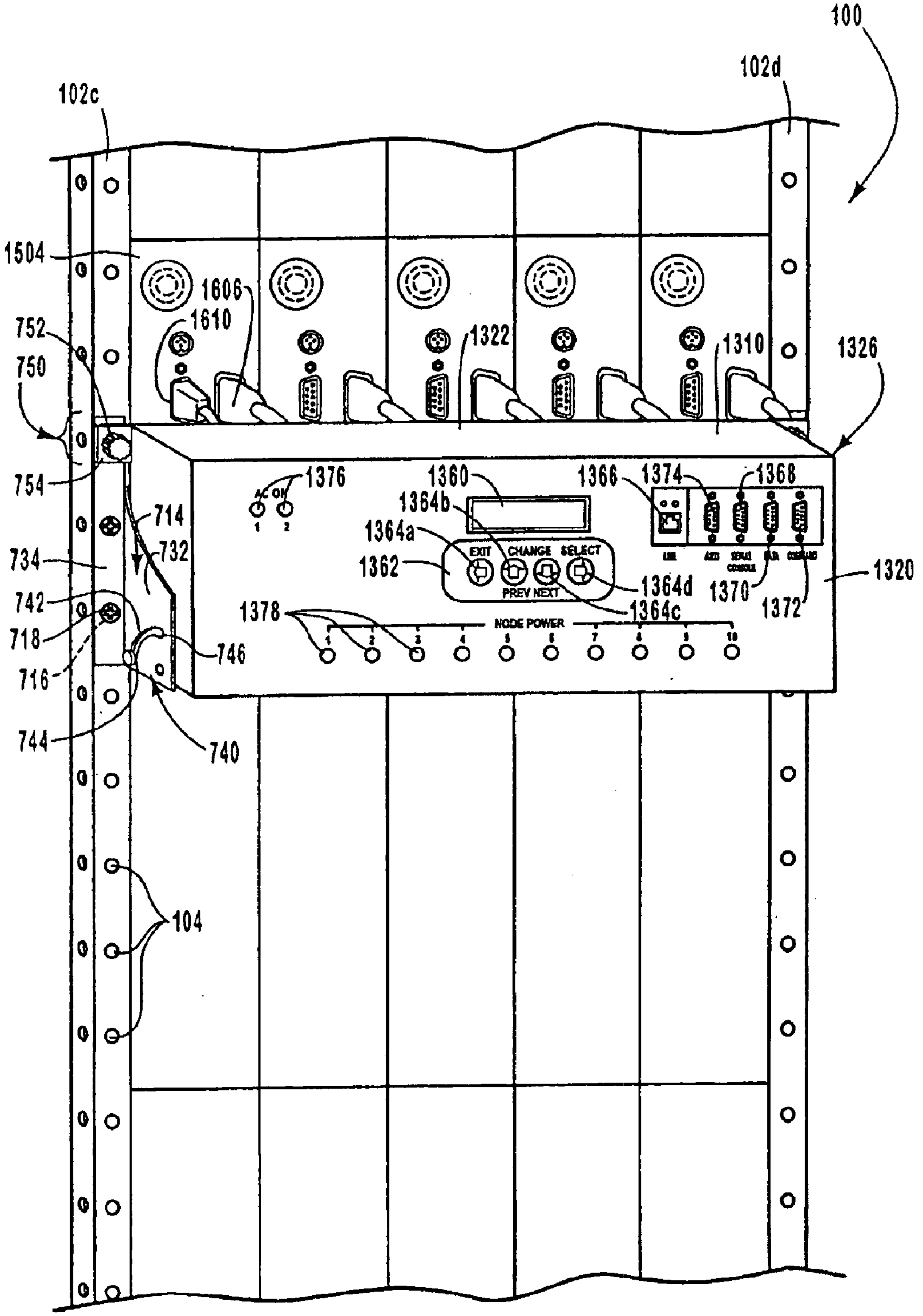
FIG. 17 is a perspective view of a cluster management apparatus connected to a plurality of nodes and shown in its upright position.

FIG. 17 is a perspective view of the CMA 1310 of FIG. 16 shown in its upright position 1326. Placing the CMA 1310 into its upright position 1326 allows it 1310 to be stored in a compact configuration outside the equipment storage region. A user may wish to store the CMA 1310 in its upright position whenever the user is not connecting various ports on the CMA 1310 to one or more nodes 1504 or other CMAs 1310. The display screen 1360 and keypad 1362 allow the user to monitor node 1504 functions without moving the CMA 1310 into its extended position 1402. Also, as stated previously, the network port 1366 allows the CMA

1310 to be connected to one or more computers over a network, so that a user may manage and configure the CMA 1310 remotely.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A mounting mechanism for mounting an enclosure-mountable device to an equipment enclosure having a plurality of vertical mounting rails, the vertical mounting rails being disposed so as to define an equipment storage region, the mounting mechanism comprising:

a first portion configured to be attached to the enclosure-mountable device; and a second portion configured to be attached to at least one of the vertical mounting rails, wherein the first and second portions are configured such that the enclosure-mountable device is configurable to move from a first position outside the equipment storage region to a second position outside the equipment storage region without detaching the second portion of the mounting mechanism from the at least one of the vertical mounting rails, and wherein the first and second portions of the mounting mechanism are each disposed in planes which are substantially perpendicularly to one another in the first position and the second position.

2. The mounting mechanism of claim 1, further comprising a hinging mechanism configured to allow the enclosure-mountable device to rotate from the first position to the second position.

3. The mounting mechanism of claim 2, wherein the hinging mechanism comprises a slot in the first portion, the slot comprising a first endpoint and a second endpoint.

4. The mounting mechanism of claim 1, further comprising a securing mechanism for securing the enclosure-mountable device in the second position.

5. A mounting mechanism for mounting an enclosure-mountable device to an equipment enclosure having a plurality of vertical mounting rails, the vertical mounting rails being disposed so as to define an equipment storage region, the mounting mechanism comprising:

a first portion configured to be attached to the enclosure-mountable device;

a second portion configured to be attached to at least one of the vertical mounting rails, wherein the first and second portions are configured such that the enclosure-mountable device is configurable to move from a first position outside the equipment storage region to a second position outside the equipment storage region without detaching the second portion of the mounting mechanism from the at least one of the vertical mounting rails; and a securing mechanism for securing the enclosure-mountable device in the second position, wherein the securing mechanism comprises a female fastener attached to the second portion, the female fastener being configured to receive a male fastener attached to the enclosure-mountable device.

6. The mounting mechanism of claim 1, wherein the enclosure-mountable device comprises a power outlet configured to be connected to an electronic device.

7. The mounting mechanism of claim 6, wherein the electronic device comprises a node in a computer cluster.

8. A mounting mechanism for mounting an enclosure-mountable device to an equipment enclosure having a plurality of vertical mounting rails, the vertical mounting rails being disposed so as to define an equipment storage region, the mounting mechanism comprising:

a first portion configured to be attached to the enclosure-mountable device;

a second portion configured to be attached to at least one of the vertical mounting rails, wherein the first and second portions are configured such that the enclosure-mountable device is configurable to move from a first position outside the equipment storage region to a second position outside the equipment storage region without detaching the second portion of the mounting mechanism from the at least one of the vertical mounting rails;

wherein the enclosure-mountable device comprises a power outlet configured to be connected to an electronic device, wherein the electronic device comprises a node in a computer cluster, wherein the enclosure-mountable device further comprises a monitoring port configured to be connected to a peripheral card that is connected to an expansion slot within the node, and wherein the enclosure-mountable device further comprises a serial access port configured to be connected to a serial port within the node.

9. A mounting mechanism for mounting an enclosure-mountable device to an equipment enclosure having a plurality of vertical mounting rails, the vertical mounting rails being disposed so as to define an equipment storage region, the mounting mechanism comprising:

a mounting bracket having a first portion and a second portion, wherein the first portion is configured to be attached to the enclosure-mountable device, and wherein the second portion is configured to be attached to at least one of the vertical mounting rails;

a hinging mechanism configured to allow the enclosure-mountable device to be rotated from a first position outside the equipment storage region to a second position outside the equipment storage region without detaching the mounting bracket from the at least one of the vertical mounting rails, wherein the first and second portions of the mounting bracket are disposed substantially perpendicularly to one another in the first position and the second position; and a securing mechanism configured to secure the enclosure-mountable device in the second position.

10. The mounting mechanism of claim 9, wherein the hinging mechanism comprises a slot in the mounting bracket, the slot comprising a first endpoint and a second endpoint.

11. A mounting mechanism for mounting an enclosure-mountable device to an equipment enclosure having a plurality of vertical mounting rails, the vertical mounting rails being disposed so as to define an equipment storage region, the mounting mechanism comprising:

a mounting bracket configured to attach the enclosure-mountable device to at least one of the vertical mounting rails such that the enclosure-mountable device is disposed outside the equipment storage region in a first position;

a hinging mechanism configured to allow the enclosure-mountable device to be rotated from the first position to a second position outside the equipment storage region without detaching the mounting bracket from the at least one of the vertical mounting rails; and a securing mechanism configured to secure the enclosure-mountable device in the second position, wherein the securing mechanism comprises a female fastener attached to the mounting bracket, the female fastener being configured to receive a male fastener attached to the enclosure-mountable device.

12. The mounting mechanism of claim 9, wherein the enclosure-mountable device comprises a power outlet configured to be connected to an electronic device.

13. The mounting mechanism of claim 12, wherein the electronic device comprises a node in a computer cluster.

14. The mounting mechanism of claim 11, wherein the enclosure-mountable device comprises a power outlet configured to be connected to an electronic device, wherein the electronic device comprises a node in a computer cluster, and wherein the enclosure-mountable device further comprises:

a monitoring port configured to be connected to a peripheral card that is connected to an expansion slot within the node; and a serial access port configured to be connected to a serial port within the node.

15. An equipment enclosure for storing an enclosure-mountable device, comprising;

a plurality of vertical mounting rails disposed so as to define an equipment storage region;

an enclosure-mountable device; and a mounting mechanism, comprising:

a mounting bracket having a first portion and a second portion, wherein the first portion is configured to be attached to the enclosure-mountable device, and wherein the second portion is configured to be attached to at least one of the vertical mounting rails;

a hinging mechanism configured to allow the enclosure-mountable device to be rotated from a first position outside the equipment storage region to a second position outside the equipment storage region without detaching the mounting bracket from the at least one of the vertical mounting rails, wherein the first and second portions of the mounting bracket each are disposed in places which are substantially perpendicularly to one another in the first position and the second position; and a securing mechanism configured to secure the enclosure-mountable device in the second position.

16. The equipment enclosure of claim 15, wherein the hinging mechanism comprises a slot in the mounting bracket, the slot comprising a first endpoint and a second endpoint.

17. An equipment enclosure for storing an enclosure-mountable device, comprising:

a plurality of vertical mounting rails disposed so as to define an equipment storage region;

an enclosure-mountable device; and a mounting mechanism, comprising:

a mounting bracket configured to attach the enclosure-mountable device to at least one of the vertical mounting rails such that the enclosure-mountable device is disposed outside the equipment storage region in a first position;

a hinging mechanism configured to allow the enclosure-mountable device to be rotated from the first position to a second position outside the equipment storage region without detaching the mounting bracket from the at least one of the vertical mounting rails; and a securing mechanism configured to secure the enclosure-mountable device in the second position, wherein the securing mechanism comprises a female fastener attached to the mounting bracket, the female fastener being configured to receive a male fastener attached to the enclosure-mountable device.

18. The equipment enclosure of claim 15, wherein the enclosure-mountable device comprises a power outlet configured to be connected to an electronic device.

19. The equipment enclosure of claim 18, wherein the electronic device comprises a node in a computer cluster.

20. An equipment enclosure for storing an enclosure-mountable device, comprising:

a plurality of vertical mounting rails disposed so as to define an equipment storage region;

an enclosure-mountable device; and a mounting mechanism, comprising:

a mounting bracket configured to attach the enclosure-mountable device to at least one of the vertical mounting rails such that the enclosure-mountable device is disposed outside the equipment storage region in a first position;

a hinging mechanism configured to allow the enclosure-mountable device to be rotated from the first position to a second position outside the equipment storage region without detaching the mounting bracket from the at least one of the vertical mounting rails; and a securing mechanism configured to secure the enclosure-mountable device in the second position;

wherein the enclosure-mountable device comprises a power outlet configured to be connected to an electronic device, wherein the electronic device comprises a node in a computer cluster, wherein the enclosure-mountable device further comprises a monitoring port configured to be connected to a peripheral card that is connected to an expansion slot within the node, and wherein the enclosure-mountable device further comprises a serial access port configured to be connected to a serial port within the node.

21. A method for maximizing equipment storage density within an equipment enclosure having a plurality of vertical mounting rails, the vertical mounting rails being disposed so as to define an equipment storage region, the method comprising:

attaching a first portion of a mounting bracket to an enclosure-mountable device;

attaching a second portion of the mounting bracket to at least one of the vertical mounting rails;

rotating the enclosure-mountable device from a first position outside the equipment storage region to a second position outside the equipment storage region without detaching the mounting bracket from the at least of the, vertical mounting rails, wherein the first and second portions of the mounting bracket each are disposed in places which are substantially perpendicularly to one another in the first position and the second position; and securing the enclosure-mountable device in the second position.

22. The method of claim 21, wherein the enclosure-mountable device comprises a power port configured to be connected to an electronic device.

23. The method of claim 22, wherein the electronic device comprises a node in a computer cluster.

24. A method for maximizing equipment storage density within an equipment enclosure having a plurality of vertical mounting rails, the vertical mounting rails being disposed so as to define an equipment storage region, the method comprising:

attaching a mounting bracket to at least one of the vertical mounting rails;

attaching the mounting bracket to an enclosure-mountable device such that the enclosure-mountable device is disposed outside the equipment storage region in a first position, wherein the enclosure-mountable device comprises a power port configured to be connected to an electronic device, wherein the electronic device comprises a node in a computer cluster, wherein the enclosure-mountable device further comprises a monitoring port configured to be connected to a peripheral card that is connected to an expansion slot within the node, and wherein the enclosure-mountable device further comprises a serial access port configured to be connected to a serial port within the node;

rotating the enclosure-mountable device from the first position to a second position outside the equipment storage region without detaching the mounting bracket from the at least one of the vertical mounting rails; and securing the enclosure-mountable device in the second position.

* * * * *

UNITED STATES PATENT AND TRADEMARK OFFICE

CERTIFICATE OF CORRECTION

PATENT NO. : 6,906,925 B2

DATED : June 14, 2005

INVENTOR(S) : Shane R. Robbins et al.

It is certified that error appears in the above-identified patent and that said Letters Patent is hereby corrected as shown below:

Column 12,
Line 46, replace "bracket are disposed substantially" with -- bracket each are disposed in planes which are substantially --.

Column 13,
Line 25, replace "comprising;" with -- comprising: --.
Line 42, replace "places which" with -- planes which --.

Column 14,
Line 54, replace "least of the," with -- least one of the --.
Line 57, replace "places which" with -- planes which --.

Signed and Sealed this

Fourteenth Day of March, 2006

JON W. DUDAS

*Director of the United States Patent and Trademark Office*